A. E. Graham,
Bridle Rein.
N° 64,970.  Patented May 21, 1867.
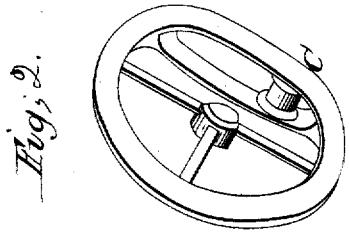
Fig. 2.
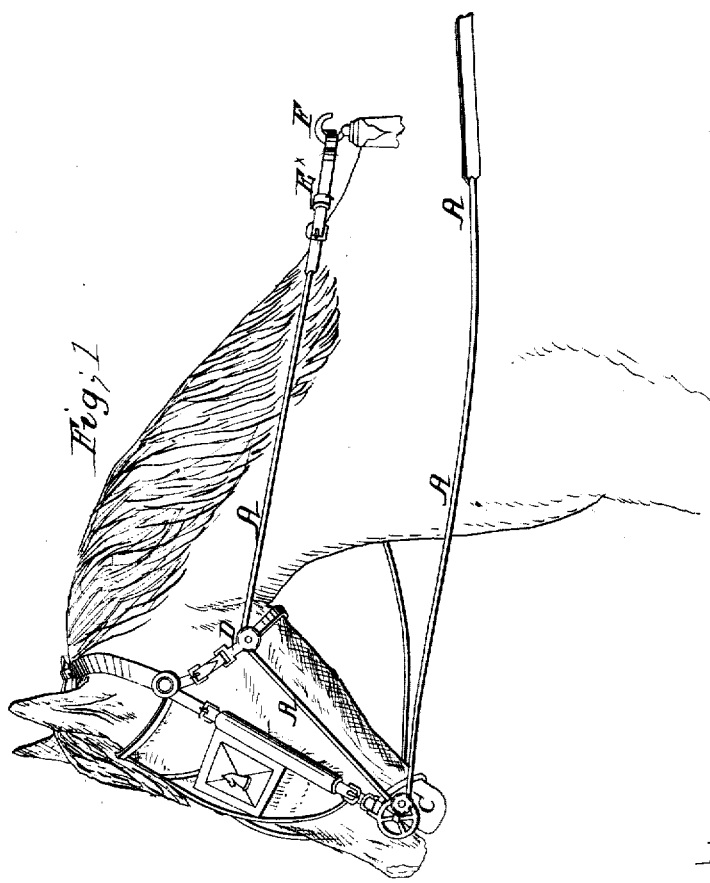
Fig. 1.
Fig. 3.
Witnesses;
A. A. Yeatman
Charles Alexander
Inventor,
A. E. Graham
per
Alexander & Mason
Attorneys

United States Patent Office.

A. E. GRAHAM, OF RICHLAND, INDIANA.

Letters Patent No. 64,970, dated May 21, 1867; antedated November 21, 1866.

IMPROVEMENT IN BRIDLE-REINS.

*The Schedule referred to in these Letters Patent and making part of the same.*

TO ALL WHOM IT MAY CONCERN:

Be it known that I, A. E. GRAHAM, of Richland, in the county of Rush, and State of Indiana, have invented a new and useful Improvement in Harness-Reins; and I do hereby declare that the following is a full, clear, and exact description thereof, which will enable others skilled in the art to make and use the same, reference being had to the accompanying drawings forming part of this specification, in which—

Figure 1 is a side view of the head of a horse, harnessed, for illustrating the present invention.

This invention has for its principal objects, first, to obviate the necessity for check-reins, and at the same time so improve the main reins that the horse may be checked up to any desired degree by the driver; and second, so that the horse or horses may drink without rendering it necessary for the driver to descend from his seat, as is now the case, in order to loosen the check-reins ordinarily used. And this invention consists of harness-reins, which pass both through the terret and martingale-rings as with ordinary reins, but, in addition thereto, also through the bit and gag-rings, or through pulleys attached to them, and from thence pass back to the check-hook, to which they are buckled, or to short straps permanently attached to such hook, as will be hereinafter more fully described.

A A, in the drawings, represent the harness-reins, which are to be passed through the martingale and terret-rings as with ordinary harness-reins. C and D, pulleys, respectively attached to the bit and to the gag-strap, through or around which pulleys the reins A are passed, and thence are carried back to the short straps E which are permanently attached to the check-hook F. The buckles, by means of which the reins A are connected to the straps E, should be attached to the latter straps E, as in this manner the reins A will have no buckles upon them to interfere with the operation of passing them through the various rings and pulleys necessary in properly arranging the reins on the harness.

By constructing and attaching the reins in the manner above explained, it is obvious that horses may be driven with their heads either tightly checked or free, as may be desired; and that, furthermore, the horses can lower their heads to drink, when necessary, without necessitating the descent of the driver from his seat, as is now the case when the ordinary check-rein is used.

Having thus described my invention, I claim as new, and desire to secure by Letters Patent—

The continuous reins A A, passing through pulleys on the ends of the bit, and also through pulleys each side of the gag-rein and around the terret or check-hook, being tacked together, (as seen at $x$,) or prevented by a keeper from sliding through said check-hook, substantially as described and for the purposes herein specified.

The above specification of my invention signed by me this        day of      , 1866.

A. E. GRAHAM.

Witnesses:
JAMES O'BRIEN,
MORDECAI SWEET.